(12) United States Patent
Jung et al.

(10) Patent No.: US 6,307,851 B1
(45) Date of Patent: Oct. 23, 2001

(54) SYSTEM FOR RADIO TRANSMISSION OF DIGITAL SIGNALS BETWEEN A PLURALITY OF SUBSCRIBER STATIONS AND BASE STATION

(75) Inventors: Peter Jung, Otterberg; Friedbert Berens, Kaiserslautern; Paul-Walter Baier, Kaiserslautern; Jörg Plechinger, Kaiserslautern; Karl Kammerlander, Wolfratshausen, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/171,069
(22) PCT Filed: Mar. 24, 1997
(86) PCT No.: PCT/DE97/00846
   § 371 Date: Oct. 9, 1998
   § 102(e) Date: Oct. 9, 1998
(87) PCT Pub. No.: WO97/41647
   PCT Pub. Date: Nov. 6, 1997

(30) Foreign Application Priority Data

Apr. 26, 1996 (DE) .............................................. 196 16 829

(51) Int. Cl.[7] .................................................... H04B 7/216
(52) U.S. Cl. ......................................... 370/342; 370/335
(58) Field of Search ................................... 370/320, 335, 370/342, 441, 479

(56) References Cited

U.S. PATENT DOCUMENTS 5,734,646 * 3/1998 I et al. ................................. 370/335
5,781,542 * 7/1998 Tanaka et al. ....................... 370/342
5,856,971 * 1/1999 Gitlin et al. ......................... 370/335

* cited by examiner

Primary Examiner—Wellington Chin
Assistant Examiner—Brenda Pham
(74) Attorney, Agent, or Firm—Schiff Hardin & Waite (57) ABSTRACT

The new CDMA (Code Division Multiple Access) system structure which is equivalent to the structure of a CDMA system operating with direct code spread (DS, Direct Sequence) but operates with multicarrier (MC) methods. The multicarrier method is introduced a suitable selection of the spread code, with the result that the production of signals in CDMA systems with DS and with MC is harmonized and JD (Joint Detection) multisubscriber detection methods, which are known per se, with or without diversity reception can be used.

31 Claims, 1 Drawing Sheet

SYSTEM FOR RADIO TRANSMISSION OF DIGITAL SIGNALS BETWEEN A PLURALITY OF SUBSCRIBER STATIONS AND BASE STATION

BACKGROUND OF THE INVENTION

The invention relates to a system for transmitting digital signals by radio between a plurality of subscriber stations and a base station using a multicarrier code division multiple access method.

In many radio transmission systems, particular in modern mobile radio systems, the allocated frequency bands have to be used as efficiently as possible because of the restricted number of frequencies available. Furthermore, radio transmission systems, in particular of the mobile kind, must be configured in such a way that mutual interference is so minimal that they can be operated one next to the other. In particular in mobile radio systems there are two further relatively serious difficulties, namely on the one hand the problem of multiple access (MA), which arises owing to the simultaneous transmission of a plurality of signals which are assigned to subscribers which are respectively active and which use the same RF carrier, and on the other hand the equalization problem which arises owing to the frequency-selectivity of the radio channel. Code Division Multiple Access, also referred to as CDMA, is a known and convenient solution of the multiple access problem. In CDMA radio systems, a plurality of subscribers transmit their subscriber signals in a common RF frequency band over a time-variant and frequency-selective radio channel. However, time-variant mutual interference, which is referred to as Multiple Access Interference (MAI) may arise between the simultaneously transmitted signals and can be reduced by means of suitable signal separation techniques. In addition, in CDMA radio systems, time-variant Intersymbol Interference (ISI) may arise between the data symbols which are successively transmitted by one specific subscriber. The signal mixture arising at the receiver can be evaluated by means of individual subscriber detection or advantageously separated by means of algorithms for multisubscriber detection. This separation is advantageous in terms of the implementation of CDMA systems in particular in terrestrial mobile radio because it is possible to dispense with complex methods for power control and for soft handover. In addition, diversity reception, for example as a result of the use of a plurality of receiver antennas (antenna diversity) is advantageous since it enables the transmission quality to be improved. CDMA systems with direct code spread (DS, Direct Sequence), diversity reception and multisubscriber detection are known. An advantageous method which is applied successfully in DS-CDMA systems for multisubscriber detection is the so-called JD (Joint Detection) method which is described, for example, in the essay by P. Jung, B. Steiner: "Konzept eines CDMA-Mobilfunksystems mit gemeinsamer Detektion für die dritte Mobilfunkgeneration [Concept of a CDMA mobile radio system with common detection for the third mobile radio generation]", Parts 1 and 2, "Nachrichtentech., Elektron. [Telecommunications, electronics]", SCIENCE, Berlin 45 (1995) 1, pages 10 to 14 and 2, pages 24 to 27. An important advantage of such CDMA systems is the utilization of frequency diversity and interference diversity. A disadvantage with DS-CDMA systems is the low degree of influence on the dividing up and allocation of the frequency resource. Combining CDMA systems with multicarrier (MC) methods eliminates this disadvantage.

Multicarrier transmission methods have their origin in the orthogonal frequency division multiplexing (OFDM) technique. In OFDM, the carrier bandwidth $B_u$ which is assigned to a particular subscriber k is divided up into $Q_T$ subcarriers, lying one next to the other, with identical bandwidth $B_s$. This results in:

$$B_U = Q_T \cdot B_s \qquad (1)$$

In order to permit overlapping subcarriers which are orthogonal with respect to the data symbol period $T_s$, the bandwidth $B_s$ equal to $1/T_s$ is selected. Orthogonal subcarriers facilitate the use of receivers of simple design. Below, it is assumed that k subscribers transmit N, to the base m, complex data symbols $\underline{d}_n(K)$, n=1 ... N within the time period $T_{bu}$. The data symbols $\underline{d}_n^{(k)}$, n=1 ... N are taken from the complex set $$\underline{V} = \{\underline{v}_1, \underline{v}_2 \ldots \underline{v}_m\}, \underline{v}_\mu \in C, \mu=1 \ldots m, m \in IN \qquad (2).$$

The transmission takes place via the RF carrier with the bandwidth $B_u$ specified in equation (1). With OFDM, the following applies:

$$Q_T = N \qquad (3).$$

Each data symbol $\underline{d}_n^{(k)}$ is assigned here to a particular subcarrier. For this reason, all the data symbols $\underline{d}_n^{(k)}$ are transmitted simultaneously during the previously mentioned time period $T_{bu}$. The symbol period $T_s$ is thus equal to the time period $T_{bu}$ in OFDM.

The energy of MC-CDMA signals is restricted in spectral terms very well to the assigned RF carrier with the bandwidth $B_u$, which is due to the closeness to OFDM. Thus, adjacent channel interference is very low. This fact is very advantageous in terms of the coexistence of the systems. Furthermore, the spectra of MC-CDMA signals in the band $B_u$ are rather white, which is favorable in terms of equalization and detection. The fading phenomena experienced by each subcarrier are largely frequency-unselective because the bandwidth of each subcarrier $B_s$ is usually narrower than the coherent bandwidth $B_c$ of a mobile radio channel. This absence of frequency-selectivity in conjunction with the orthogonality of the subcarriers make it possible to use simple suboptimum detectors in MC-CDMA. Since a data symbol $\underline{d}_n^{(k)}$ is assigned to a single subcarrier in OFDM, OFDM has a low frequency diversity capacity. On the other hand, in MC-CDMA, a data symbol $\underline{d}_n^{(k)}$ is transmitted over Q subcarriers simultaneously where $1 < Q \leq Q_T$, which permits good utilization of frequency diversity. If frequency gaps are inserted between the Q subcarriers to which a particular data symbol $\underline{d}_n^{(k)}$ is allocated, the frequency diversity behavior can easily be brought about, which additionally increases the flexibility of the system. For example, subcarriers assigned to other data symbols $\underline{d}_{n'}^{(k)}$, n'≠n can be assigned in the frequency gaps between the previously mentioned Q subcarriers. The technique of frequency diversity is not considered further below. Instead, it is assumed that all the Q subcarriers assigned to a specific data symbol $\underline{d}_n^{(k)}$ are adjacent, which still permits frequency diversity to be utilized provided provision is made to ensure that $Q \cdot B_s$ exceeds the coherence bandwidth $B_c$. MC-CDMA is also beneficial with interference diversity because K>1 subscribers actively use the same Q subcarriers simultaneously. Interference diversity is the key feature in achieving a high spectral efficiency η.

Existing system concepts for CDMA systems with multicarrier (MC) methods are not suitable for general use in mobile radio. Structures for CDMA systems with multicarrier (MC) methods have existed hitherto only for environments with low time variance and negligible intersymbol interference. Algorithms for multisubscriber detection have hitherto been proposed and investigated only for the down-link (from the base station to the subscriber stations). Until now, only conventional individual subscriber detectors have been proposed and investigated for the uplink (from the subscriber station to the base station) which is rarely considered because it is more complex. Diversity reception, for example Coherent Receiver Antenna Diversity (CRAD) in such CDMA systems with multicarrier methods has not been investigated to date.

The relation between the number $Q_T$ of all the subcarriers on the RF frequency band $B_u$ and the number Q of the subcarriers assigned to a particular data symbol $\underline{d}_n^{(k)}$ is as follows in MC-CDMA:

$$Q_T = Q \cdot N_s \qquad (4)$$

In the equation (4), $N_s$ signifies the number of data symbols $\underline{d}_n^{(k)}$ transmitted simultaneously by a subscriber k. The data symbol period length is thus $$T_s = \frac{T_{bu}}{N} \cdot N_s. \qquad (5)$$

For given values of $B_u$ and $T_{bu}$, a MC-CDMA system concept depends on the selection of Q and $N_s$.

Different selections of Q and $N_s$ lead to possible MC-CDMA concepts with particular features. Given a known possible MC-CDMA concept, $N_s=N$, which means that all the data symbols $\underline{d}_n^{(k)}$ are transmitted simultaneously. In addition, with this known concept $B_s=B_u/(Q \cdot N)$ and $T_s=T_{bu}$ apply. According to a series of investigations of MC-CDMA, this known concept facilitates the advantageous avoidance of time-variable intersymbol interference by introducing protective intervals of the period length $T_g > T_M$ ($T_M$=duration of the channel pulse response) However, the introduction of protective intervals can be used only to a certain extent if $T_s >> T_g$. In mobile radio environments, the length $T_M$ of the channel pulse response is in the order of magnitude of between several microseconds and several tens of microseconds, which requires a data symbol period length of $T_s > 100$ µs.

SUMMARY OF THE INVENTION

The invention is based on the object of replacing inflexible CDMA system structures with multicarrier methods by a more flexible CDMA system structure with multicarrier methods, which is generally suitable for mobile-radio. This new system structure is intended to permit the specific advantages of CDMA (frequency diversity, interference diversity) to be combined with the advantage of multicarrier methods (flexible allocation of the frequency resource) and to allow both for multiple access interference (MAI) and intersymbol interference (ISI). The intention is that diversity reception will be allowed for explicitly. In addition, the new structures specified by the invention are intended to harmonize CDMA systems with DS (Direct Sequence) and with multicarrier methods, which then permits flexible CDMA systems to be implemented more favorable in terms of expenditure and allows the production of signals in CDMA systems with DS and with multicarrier methods to be harmonized. In addition, the invention is intended to make available suitable algorithms for multisubscriber detection for application in CDMA systems with multicarrier methods and diversity reception. It is intended that it will be possible to use these algorithms both for the uplink and for the down-link.

In general terms the present invention is a system for transmitting digital signals by radio between a plurality of subscriber stations and a base station using MC-CDMA (Multicarrier-Code Division Multiple Access) method in which a plurality of useful links are processed simultaneously in a common RF frequency band. Data blocks of finite length, which can be represented by data vectors $$\underline{d}^{(k)} = (\underline{d}_1^{(k)}, \underline{d}_2^{(k)} \ldots \underline{d}_N^{(k)})^T, \underline{d}_n^{(k)} \in V, V \subset C, k=1 \ldots K, n=1 \ldots N, K, N \in \mathbb{N}$$

composed in each case of N complex data symbols $\underline{d}_n^{(k)}$ to the base m with a data symbol period length $T_s$, are transmitted by the K subscriber stations with the application of a spread code, assigned to the respective subscriber station k, k=1 . . . K, with Q subcarriers distributed uniformly within the RF frequency band. They are decoded again at the reception site using this spread code and by means of a CDMA detector device. The number of data symbols $\underline{d}_n^{(k)}$ transmitted simultaneously by a specific subscriber station k is one and thus all the data symbols $\underline{d}_n^{(k)}$ of a subscriber station are transmitted successively. This transmission takes place using the Q subcarriers of the bandwidth $B_s=B_u/Q=1/T_s$, the subcarriers numbered with q, q=1 . . . Q each having a single center of frequency $f_q$, q=1 . . . Q, in accordance with $$f_q = \frac{q-1}{T_s}, q = 1 \ldots Q.$$

Each data symbol $\underline{d}_n^{(k)}$ of a subscriber station is spread over all the Q subcarriers of the bandwidth $B_s$ by using a subscriber-specific signature code sequence $$\underline{c}^{(k)} = (\underline{c}_1^{(k)}, \underline{c}_2^{(k)} \ldots \underline{c}_Q^{(k)})^T, \underline{c}_q^{(k)} \in V_c, V_c \subset C, k=1 \ldots K, q=1 \ldots Q, K, Q \in \mathbb{N}$$

composed of chips $\underline{c}_i^{(k)}$, each chip being assigned to a particular subcarrier. A subscriber station k, k=1 . . . K transmits a linearly modulated signal which is given in the equivalent low-pass filter region by $$\underline{d}^{(k)}(t) = \sum_{n=1}^{N} \underline{d}_n^{(k)} \cdot \underline{c}^{(k)}(t-[n-1]T_s; \underline{c}^{(k)}).$$

The linear MC-CDMA spread modulation is formed by sampling of $\underline{c}^{(k)}$ (t; $\underline{c}^{(k)}$) made at a rate $1/T_c$, the sampled values $\zeta_q^{(k)}$, q=1 . . . Q, K produced by means of these samplings giving rise to vectors $$\zeta^{(k)} = (\zeta_1^{(k)}, \zeta_2^{(k)} \ldots \zeta_Q^{(k)})^T, \zeta_q^{(k)} \in C, k=1 \ldots K, q=1 \ldots Q, K, Q \in \mathbb{N}$$

A relation between the vectors $\zeta^{(k)}$ and the spread code vectors $\underline{c}^{(k)}$ is given by means of the equation $\zeta^{(k)} = D \underline{c}^{(k)}$ with a matrix $$\underline{D} = (D_{\alpha,\beta}), D_{\alpha,\beta} = \frac{1}{\sqrt{Q}} \exp\left\{j\frac{2\pi}{Q}(\alpha-1)(\beta-1)\right\},$$

$$\alpha, \beta = 1 \ldots Q$$

of the inverse discrete Fourier transformation (IDFT), the vector matrix $\zeta^{(k)}$ containing Q column vectors $$\delta^{(q)} = (\delta_1^{(q)}, \delta_2^{(q)} \ldots \delta_Q^{(q)})^T,$$

$$\underline{\delta}_a^{(q)} = \frac{1}{\sqrt{Q}} \exp\left\{j\frac{2\pi}{Q}(\alpha-1)(q-1)\right\},$$

$\alpha=1 \ldots Q$, so that $\underline{D}=(\delta^{(1)}, \delta^{(2)} \ldots \delta^{(Q)})$ and thus $$\underline{\zeta}^{(k)} = (\underline{c}_1^{(k)} \delta^{(1)} + \underline{c}_2^{(k)} \delta^{(2)} + \ldots + \underline{c}_Q^{(k)} \delta^{(Q)})$$

is obtained. In view of the fact that each chip $c_q^{(k)}$ is assigned to a particular subcarrier q, the equation $\underline{\zeta}^{(k)} = \underline{Dc}^{(k)}$ is to be interpreted in such a way that the columns $\delta^{(q)}$, $q=1 \ldots Q$ of the matrix $\underline{D}$ represent the Q subcarriers and the rows of the matrix $\underline{D}$ represent the Q time moments within the data symbol period length $T_s$ during which sampled values are taken. The result of the equation $\underline{\zeta}^{(k)} = \underline{Dc}^{(k)}$ is thus a vector $\underline{\zeta}^{(k)}$ with elements $\underline{\zeta}_q^{(k)}$ which result from a linear combination of the chips $\underline{c}_q^{(k)}$.

The system is utilized in a CDMA system with multicarrier method and coherent receiver antenna diversity (CRAD).

The system has a CDMA detector device at the receive end of a station, having $K_a$ receiver antennas, for determining the estimated values $$\underline{\hat{d}}^{(k)} = (\underline{\hat{d}}^{(k)}, \underline{\hat{d}}_2^{(k)} \ldots \underline{\hat{d}}_N^{(k)})^T, \underline{\hat{d}}_n^{(k)} \in C, k=1 \ldots K, n=1 \ldots N, K, N \in IN,$$

of the data symbol sequences $d^{(k)}$ a received signal vector e, which results from $$\underline{e} = (\underline{e}^{(1)T}, \underline{e}^{(2)T} \ldots \underline{e}^{(K_a)T})^T = (\underline{e}_1, \underline{e}_2 \ldots \underline{e}_{K_a \cdot (N \cdot Q+W-1)})^T = A\,d + n,$$
$K_a, N, Q, W \in IN,$ where the combined $K_a \cdot (N \cdot Q+W-1) \times K \cdot N$ channel matrix A contains all the $K \cdot K_a$ combined channel pulse responses $$\underline{b}^{(k,ka)} = (\underline{b}_1^{(k,ka)}, \underline{b}_2^{(k,ka)} \ldots \underline{b}_{Q+W-1}^{(k,ka)})^T = h^{(k,ka)} * \underline{\zeta}^{(k)}$$

$\underline{h}_w^{(k,ka)} \in C, k=1 \ldots K, k_a=1 \ldots K_a, l=1 \ldots Q+W-1, K, K_a, Q, W \in IN,$ W=number of complex sampled values $\underline{h}_w^{(ka)}$, and where $K_a$ various interference sequences are represented by the combined interference vector $$\underline{n} = (\underline{n}^{(1)T}, \underline{n}^{(2)T} \ldots \underline{n}^{(K_a)T})^T = (\underline{n}_1, \underline{n}_2 \ldots \underline{n}_{K_a \cdot (N \cdot Q+W-1)})^T, K_a, N, Q, W \in IN$$

and the data sequence d is represented by the data symbol vector $$\underline{d} = (\underline{d}^{(1)T}, \underline{d}^{(2)T} \ldots \underline{d}^{(K)T})^T = (\underline{d}_1, \underline{d}_2 \ldots \underline{d}_{K \cdot N})^T, K, N \in IN.$$

A CDMA detector device for multisubscriber detection (Joint Detection) is provided at the receive end. This detector device operates suboptimally and is based either on a linear equalization or on a decision feedback equalization. The detector device contains a decorrelating, signal-matched filter. On the proviso that the received signal vector e defined by $$\underline{e} = (\underline{e}^{(1)T}, \underline{e}^{(2)T} \ldots \underline{e}^{(k_a)T})^T = (\underline{e}_1, e_2 \ldots \underline{e}_{K_a \cdot (N \cdot Q+W-1)})^T = A\,d + n,$$

$K_a, N, Q, W \in IN$, is known at the receiver, the operating principle of the JD detector device is specified by a set of equations $S\hat{d}=Me$, where $S=(S_{i,j})$, $i,j=1 \ldots K \cdot N$, a quadratic matrix with $K \cdot N$ rows and $K \cdot N$ columns, $M=(M_{i,j})$, $i=1 \ldots K \cdot N$, $j=1 \ldots N \cdot Q+W-1$, a $K \cdot N \times K_a \cdot (N \cdot Q+W-1)$ estimated matrix and $\underline{\hat{d}} = (\underline{\hat{d}}_1, \underline{\hat{d}}_2 \ldots \underline{\hat{d}}_{K \cdot N})^T$ is the estimated value of the data vector d defined in the equation for the received signal vector e. A linear data block equalizer with the following quantization stage is provided as CDMA detector device. Value-continuous estimated values of the data symbols are determined in the block equalizer and are combined to form vectors. Value-discrete estimated values of the data symbols are acquired in the quantization stage by quantizing the value-continuous estimated values.

A linear zero forcing block equalizer is used as linear block equalizer.

A minimum mean square error block equalizer is used as the linear block equalizer.

A data block equalizer with quantized feedback is provided as the CDMA detector device.

A zero forcing block equalizer with quantized feedback is provided as data block equalizer.

A minimum mean square error block equalizer with quantized feedback is provided as data block equalizer.

A digital signal processor which contains the CDMA detector device is provided at the receive end.

The signal processor also contains channel estimators.

A microprocessor is provided as the signal processor.

The system is used within the framework of a hybrid multiple access method which consists of a combination of Code Division Multiple Access with multicarrier method, Frequency Division Multiple Access and Time Division Multiple Access.

Antenna diversity is provided at the receive end.

An adaptive diversity with directional antennas is provided, or a non-adaptive diversity with directional antennas is provided.

The data modulation, which has been linear hitherto, is expanded to non-linear data modulation.

Linear spread modulation is expanded to non-linear spread modulation.

The system has a code spread with orthogonal sequences, either in the uplink or in the downlink or in both directions.

The system has a code spread with non-orthogonal sequences, either in the uplink or in the downlink or in both directions.

The system uses binary spread sequences or non-binary spread sequences, for example quaternary spread sequences.

The system is utilized in the field of mobile radio.

The system is utilized in the field of microwave radio.

The system is utilized in the field of satellite radio.

The system is utilized in marine radio.

The system is utilized in a cordless telephone.

The system is utilized in cable television.

The system is utilized in submarine radio.

In the CDMA system according to the invention, the number $N_s$ of the data symbols $\underline{d}_n^{(k)}$ transmitted simultaneously by a particular subscriber k is one. For this reason, all the data symbols $\underline{d}_n^{(k)}$ of the subscriber k are transmitted successively. According to the equation (4), $Q_T = Q$ and the bandwidth $B_s$ of each subcarrier is N times wider than in the known concept. With the CDMA method according to the invention, the data symbol period length $T_s$ is equal to $T_{bu}/N$. Protective intervals between successively transmitted data symbols $\underline{d}_n^{(k)}$ are, however, not introduced for reasons of economy. Owing to the fact that such protective intervals are dispensed with, intersymbol interference (ISI) is indeed caused, but it is allowed for by means of the new system structures according to the invention, as is multiple access interference (MAI).

As has already been stated in conjunction with equations (4) and (5), the suitable selection of Q and $N_s$ depends on the environment in which MC-CDMA is to be applied. For example, the respective MC-CDMA system concept must be capable of being operated in mobile radio environments which have a rapid time variance and which occur when the receiver and transmitter are arranged, for example, in high-speed trains, aircraft and satellites with low orbits. The correlation time $T_k$ in such mobile radio environments may be in the order of magnitude of only several hundred microseconds. A coherent detection then requires an iteratively improved channel estimation procedure which is based on already detected data symbols $\hat{\underline{d}}_n^{(k)}$. For this reason, the data symbol length $T_s$ in equation (5) should be considerably shorter than the minimum correlation time $T_K$. In particular, $T_s$ should be in the order of magnitude of several microseconds or at most several tens of microseconds. However, if $T_s$ is small, $Q_T$ and $N_s$ should also be small. Since the known MC-CDMA system concept requires a relatively large $T_s$, the latter is disadvantageous for an application in mobile radio. The concept of the system according to the invention fulfills the requirements mentioned above in terms of $T_s$.

Advantageous developments, possible embodiments and advantageous application areas of the system according to the invention are as follows.

BRIEF DESCRIPTION OF THE DRAWING

The features of the present invention which are believed to be novel, are set forth with particularity in the appended claims. The invention, together with further objects and advantages, may best be understood by reference to the following description taken in conjunction with the accompanying drawing, in which:

Vectors are represented here in small bold letters and matrices in large bold letters. Complex variables are underlined. The symbols $(\cdot)^*$, $(\cdot)^T$, $\|\ \|$ and $E\{\cdot\}$ represent the complex conjugation, the complex transposition, the formation of the vector norm and/or the formation of anticipated values.

DESCRIPTION OF THE PREFERRED EMBODIMENTS

Figure 1:
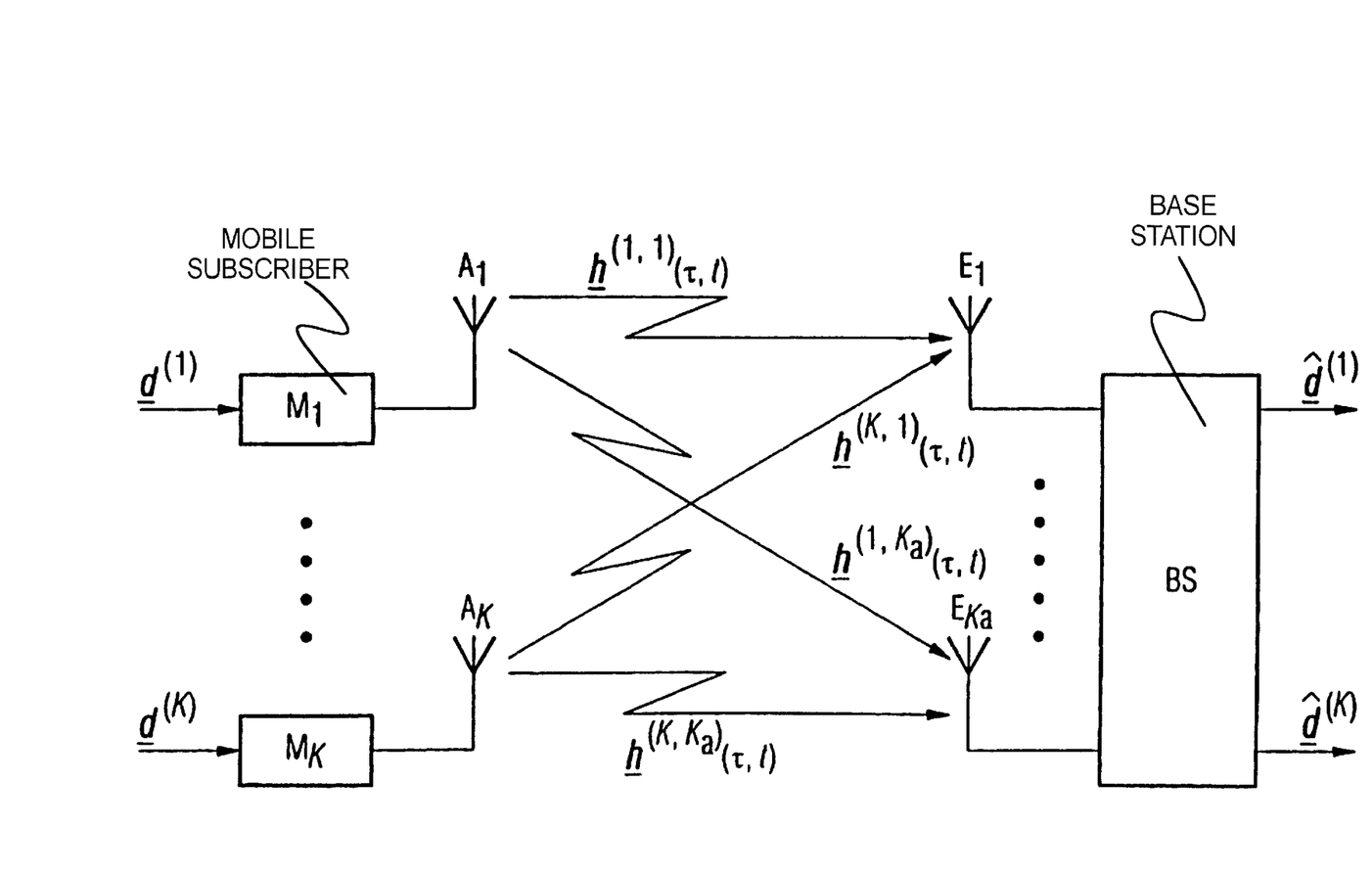
The FIGURE shows the block structure of an uplink of a mobile radio system with coherent receiver antenna diversity.

The CDMA system structure which is produced by the invention and has a multicarrier method (MC) is equivalent to that of a CDMA system with DS (Direct Sequence). In the block structure according to the FIGURE, K mobile subscribers $M_1 \ldots M_K$ are active simultaneously on the same RF carrier with the bandwidth $B_u$. Each mobile subscriber $M_1 \ldots M_K$ has a single transmitter antenna $A_1 \ldots A_K$. The transmitted signals are received at $K_a$ receiver antennas $E_1 \ldots E_{K_a}$ in a base station JD receiver BS. Thus, the transmission of the K subscriber signals takes place over $K \cdot K_a$ different radio channels with time-variant complex pulse responses $$\underline{h}^{(k,k_a)}(\tau, t), k=1 \ldots K, k_a=1 \ldots K_a, K, K_a \in \mathbb{N} \quad (6)$$

In expression (6), the pulse response $\underline{h}^{(k,k_a)}(\tau, t)$ relates to the connection between the subscriber k and the receiver antenna $E_{k_a}$ on the one hand and the base station BS on the other. In expression (6), $\tau$ designates the delay parameter which relates to the time spread, i.e. the distortion, of the transmitted signal owing to multipath reception, and t designates the real time relating to the time variation of the radio channel.

The production of the MC-CDMA signals assigned to a mobile subscriber k, k=1 . . . K is described below. The following mathematical representation of the MC-CDMA signals is the reason both for the discrete-time model representation described later and for the particular multisubscriber detection (JD=Joint Detection), which is also described later and which has receiver antenna diversity. As has already been stated, each subscriber transmits k finite data sequences $$\underline{d}^{(k)}=(\underline{d}_1^{(k)},\underline{d}_2^{(k)} \ldots \underline{d}_N^{(k)})^T, \underline{d}_n^{(k)} \in \underline{V}, \underline{V} \subset \mathbb{C}, k=1 \ldots K, n=1 \ldots N, K, N \in \mathbb{N} \quad (7)$$

Each data sequence $\underline{d}^{(k)}$ is composed of N complex data symbols $\underline{d}_n^{(k)}$ to the base m, with a data symbol period length $T_s$. The data symbols $\underline{d}_n^{(k)}$ are taken from a finite complex set $\underline{V}$ according to the expression (2).

Transmission takes place using $Q_T=Q$ subcarriers of the bandwidth $B_s=B_u/Q=1/T_s$. The Q subcarriers are numbered with q, q=1 . . . Q. Each subcarrier q has a single center of frequency $f_q$, q=1 . . . Q which is selected according to $$f_q = \frac{q-1}{T_s}, q = 1 \ldots Q. \quad (8)$$

According to the relation (8), the first subcarrier of the bandwidth $1/T_s$ has the center of frequency $f_1=0$, the second subcarrier of the bandwidth $1/T_s$ has the center of frequency $f_2=1/T_s$, the third subcarrier of the bandwidth $1/T_s$ has the center of frequency $f_3=2/T_s$, and so on.

It follows from the relation (8) that the center of frequency of the RF carrier with the bandwidth $B_u$ is $$f_c = \frac{Q-1}{2 \cdot T_s} \neq 0. \quad (9)$$

In the equivalent low-pass region which is considered in the following calculations, the center of frequency $f_c$ of the RF carrier is therefore not equal to zero.

The center frequency $f_q$, given by the equation (8), of the subcarrier q which is represented by the weighted complex sinusoidal $$(1/\sqrt{Q})\exp\{j2\pi f_q t\}$$

results in a phase displacement equal to $2 \cdot \pi \cdot (q-1)$ during the data symbol period $T_s$. The factor $$(1/\sqrt{Q}) \text{ in } (1/\sqrt{Q})\exp\{j2\pi f_q t\}$$

is required for energy normalization. Each data symbol $\underline{d}_n^{(k)}$, n=1 . . . N of a subscriber k is spread over all Q subcarriers of the bandwidth $B_s=1/T_s$ by using the user-specific signature sequence $$\underline{c}^{(k)}=(\underline{c}_1^{(k)},\underline{c}_2^{(k)} \ldots \underline{c}_Q^{(k)})^T, \underline{c}_q^{(k)} \in \underline{V}_c, \underline{V}_c \subset \mathbb{C}, k=1 \ldots K, q=1 \ldots Q, K, Q \in \mathbb{N} \quad (10)$$

in order to permit coexistence of K simultaneously transmitted subscriber signals on the same carrier of the bandwidth $B_u$. The complex signature elements $\underline{c}_q^{(k)}$ of the equation (10) which are to the $\tilde{m}$ base are designated as chips. The chips $\underline{c}_q^{(k)}$ are taken from the complex set $$\underline{V}_c=\{\underline{v}_{c,1},\underline{v}_{c,2} \ldots \underline{v}_{c,\tilde{m}}\}\underline{v}_{c,\mu} \in \mathbb{C}, \mu=1 \ldots \tilde{m}, \tilde{m} \in \mathbb{N} \quad (11)$$

Each chip $\underline{c}_q^{(k)}$, q=1 ... Q, is assigned to a particular subcarrier q. This means that the chip $\underline{c}_1^{(k)}$ is assigned to the subcarrier 1, the chip $\underline{c}_2^{(k)}$ is assigned to the subcarrier 2, the chip $\underline{c}_3^{(k)}$ is assigned to the subcarrier 3 etc. With $f_q$ according to the relation (8), the spread modulation of the data symbol $\underline{d}_n^{(k)}$ is given by the time-delayed version $\underline{c}^{(k)}(t-[n-1]T_s;\underline{c}^{(k)})$ of $$\underline{c}^{(k)}(t;\underline{c}^{(k)}) = \text{rect}\left\{\frac{t}{T_s} - \frac{1}{2}\right\} \cdot \frac{1}{\sqrt{Q}} \cdot \qquad (12)$$

$$\sum_{q=1}^{Q} \underline{c}_q^{(k)} \cdot \exp[j2\pi f_q t].$$

The basis of the spread modulation is therefore a pulse $\underline{c}^{(k)}(t;\underline{c}^{(k)})$. The shape of this pulse $\underline{c}^{(k)}(t;\underline{c}^{(k)})$ is dependent on the selection of the Q center of frequencies $f_q$ given in the relation (8) and on the subscriber-specific signature sequence $\underline{c}^{(k)}$ according to equation (10). According to equation (12), the pulse $\underline{c}^{(k)}(t;\underline{c}^{(k)})$ is of the length $T_s$ and is given by the superimposition of the complex sinusoidal $$(1/\sqrt{Q})\exp\{j2\pi f_q t\}, \; q=1 \ldots Q,$$

which are weighted with chips $\underline{c}_q^{(k)}$ according to equation (10). Since the center of frequencies $f_q$ of these subcarriers are selected according to the equation (8), the subcarriers are orthogonal over the time period $T_s$.

A subscriber k, k=1 ... K emits a modulated subscriber signal which is given by $$\underline{d}^{(k)}(t) = \sum_{n=1}^{N} d_n^{(k)} \cdot \underline{c}^{(k)}(t - [n-1]T_s; \underline{c}^{(k)}) \qquad (13)$$

in the equivalent low-pas filter region. $\underline{d}^{(k)}(t)$ is produced by means of linear modulation, cf. equation (13). The modulated subscriber signal $\underline{d}^{(k)}(t)$ is thus specified by means of the superimposition of delayed and weighted pulse replicas $\underline{c}^{(k)}(t;\underline{c}^{(k)})$ which was presented in equation (13). The modulated subscriber signal $\underline{d}^{(k)}(t)$ represented in equation (13) is produced identically to the way in which subscriber signals are produced in JD-CDMA (Joint Detection CDMA).

$K_a$ replicas of the modulated signal $\underline{d}^{(k)}(t)$ specified in the equation (13) are received at the $K_a$ receiver antennas $E_1 \ldots E_{K_a}$ of the base station BS. Each of these $K_a$ replicas has been influenced by the radio channels with the pulse responses $\underline{c}^{(k,ka)}(\tau, t)$, k fixed, $k_a=1 \ldots K_a$, according to equation (6). At each receiver antenna $E_{K_a}$ there are simultaneously K received signals which originate from the K subscribers. These K received signals are superimposed linearly and form a signal mixture. At a different receiver antenna $E_{k'_a} \neq E_{k_a}$, the K received signals originating from the K subscribers differ from those which have been received at the receiver antenna $E_{k_a}$. Thus, $K_a$ different signal mixtures which are each assigned to a different receiver antenna are processed by the base station BS. The suitable processing of these $K_a$ different signal mixtures facilitates improvement of the implementation in comparison with implementation in a receiver with a single receiver antenna. This improvement of the implementation comprises reducing the signal-to-noise ratio for a given bit error rate $P_b$. By processing the $K_a$ signal mixtures, the receiver of the base station BS determines the estimated values $$\underline{\hat{d}}^{(k)} = (\hat{d}_1^{(k)}, \hat{d}_2^{(k)} \ldots \hat{d}_N^{(k)})^T, \; \underline{\hat{d}}_n^{(k)} \in \underline{V}, \; \underline{V} \subset C, \; k=1 \ldots K,$$

$$n=1 \ldots N, \; K, \; N \in IN. \qquad (14)$$

of the data symbol sequences $\underline{d}^{(k)}$ defined by the equation (7).

The further explanation of the system concept according to the invention is given with reference to a discrete-time model representation.

Each of the $K_a$ signal mixtures present at the $K_r$ receiver antennas $E_1 \ldots E_{k_a}$ must be band-limited so that digital signal processing is made possible. The output signal of the filter which is used for this band-limitation is sampled at a rate $Q/T_s$ which corresponds to the chip rate $1/T_c = Q/T_s$ in JD-CDMA.

The linear MC-CDMA spread modulation which is presented in the equation (12) is formed by sampled values of $\underline{c}^{(k)}(t;\underline{c}^{(k)})$ taken at a rate $1/T_c$. The sampled values $\zeta_q^{(k)}$, q=1 ... Q, which are produced by these samplings form the K vectors $$\underline{\zeta}^{(k)} = (\zeta_1^{(k)}, \zeta_2^{(k)} \ldots \zeta_Q^{(k)})^T, \; \zeta_q^{(k)} \in C, \; k=1 \ldots K, \; q=1 \ldots Q, \; K, Q \in IN \qquad (15).$$

With the matrix $$\underline{D} = (\underline{D}_{\alpha,\beta}), \; \underline{D}_{\alpha,\beta} = \frac{1}{\sqrt{Q}}\exp\left\{j\frac{2\pi}{Q}(\alpha-1)(\beta-1)\right\}, \qquad (16)$$

$$\alpha, \beta = 1 \ldots Q$$

of the inverse discrete Fourier transformation (IDFT), the relation between $\underline{\zeta}^{(k)}$ according to equation (15) and $\underline{c}^{(k)}$ according to equation (10) is given by $$\underline{\zeta}^{(k)} = \underline{D} \; \underline{c}^{(k)} \qquad (17).$$

The matrix (17) contains the Q column vectors $$\underline{\delta}^{(q)} = (\underline{\delta}_1^{(q)}, \underline{\delta}_2^{(q)} \ldots \underline{\delta}_Q^{(q)})^T, \qquad (18)$$

$$\underline{\delta}_\alpha^{(q)} = \frac{1}{\sqrt{Q}}\exp\left\{j\frac{2\pi}{Q}(\alpha-1)(q-1)\right\},$$

$$\alpha = 1 \ldots Q.$$

As a result, the following is obtained:

$$\underline{D} = (\underline{\delta}^{(1)}, \underline{\delta}^{(2)} \ldots \underline{\delta}^{(Q)}) \qquad (19).$$

Functions (19) and (17) result in:

$$\underline{\zeta}^{(k)} = (\underline{c}_1^{(k)}\underline{\delta}^{(1)} + \underline{c}_2^{(k)}\underline{\delta}^{(2)} + \ldots + \underline{c}_Q^{(k)}\underline{\delta}^{(Q)}) \qquad (20).$$

In view of the fact that each chip $\underline{c}_q^{(k)}$ is assigned to a particular subcarrier q, the following interpretation of the equation (17) is simple. The columns $\underline{\delta}^{(q)}$, q=1 ... Q, of the matrix $\underline{D}$ represent the Q subcarriers. The rows of the matrix $\underline{D}$ form the Q time points within the data symbol period $T_s$ during which sampled values are taken. The result of the equation (17) is thus a vector $\underline{\zeta}^{(k)}$ with elements $\zeta_q^{(k)}$ which result from a linear combination of the chips $\underline{c}_q^{(k)}$. The vectors $\underline{\zeta}^{(k)}$, k=1 ... K, can be viewed as subscriber-specific spread sequences. Thus, the only difference between JD-CDMA and the MC-CDMA system according to the invention lies in the selection of the subscriber-specific spread sequences. In JD-CDMA, the code sequences $\underline{c}^{(k)}$ are used as subscriber-specific spread sequences, and in MC-CDMA according to the invention the vectors $\underline{\zeta}^{(k)}$ which are obtained from the code sequences $\underline{c}^{(k)}$ according to equation (17) are used. Thus, the equation (17) represents the linking of JC-CDMA and the MC-CDMA system concept designed according to the invention.

In the MC-CDMA system concept according to the invention, the time variation of a mobile radio channel within the data symbol length $T_s$ is negligible. For this reason, in order to aid comprehension, the time-dependence of the channel pulse responses will no longer be given in detail below. The $K \cdot K_a$ mobile radio channels have the channel pulse responses $$\underline{h}^{(k,k_a)} = (\underline{h}_1^{(k,k_a)}, \underline{h}_2^{(k,k_a)} \ldots \underline{h}_W^{(k,k_a)})^T, \underline{h}_w^{(k,k_a)} \in \mathbb{C}, k=1 \ldots K,$$
$$k_a=1 \ldots K_a, w=1 \ldots W, K, K_a, W \notin \mathbb{IN} \quad (21).$$

Each channel pulse response $\underline{h}^{(k,k_a)}$ of the equation (21) is composed of W complex sampled values $\underline{h}_w^{(k,k_a)}$. In the uplink operating in discrete time, the data symbol sequences $\underline{d}^{(k)}$ specified in equation (7) in MC-CDMA are transmitted over $K \cdot K_a$ discrete-time channels with the combined channel pulse responses $$\underline{b}^{(k,k_a)} = (\underline{b}_1^{(k,k_a)}, \underline{b}_2^{(k,k_a)} \ldots \underline{b}_{Q+W-1}^{(k,k_a)})^T = \underline{h}^{(k,k_a)} * \underline{c}^{(k)}$$

$$\underline{h}_w^{(k,k_a)} \in \mathbb{C}, k=1 \ldots K, k_a=1 \ldots K_a, l=1 \ldots Q+W-1, K, K_a, Q,$$
$$W \notin \mathbb{IN}, \quad (22),$$

which are composed of the discrete-time folding of the channel pulse response $\underline{h}^{(k,k_a)}$, represented in equation (21), with the subscriber-specific spread sequences $\underline{c}^{(k)}$ defined in the equation (16). Intersymbol interference arises for W>1, and multiple access interference occurs for W>1 and/or for non-orthogonal signature sequences $\underline{c}^{(k)}$. The discrete-time channels with the combined channel pulse responses $\underline{b}^{(k,k_a)}$, $k=1 \ldots K$, $K_a=1 \ldots K_a$, according to the equation (22) are designated as $(Q+W-1)$ path channels. Below, it is assumed that the combined channel pulse responses $\underline{b}^{(k,k_a)}$ represented in the equation (22) are known at the receiver, which can be ensured when a perfect channel estimation is used. The channel estimation will not be taken into account below because the effect of channel estimation errors on the data detection is not of interest when the capabilities of different data detectors are being investigated.

The signal mixture which is respectively present at a receiver antenna $E_{k_a}$ is represented by the received sequence $\underline{e}^{(k_a)}$ of the length $(N \cdot Q+W-1)$. This sequence $\underline{e}^{(k_a)}$ contains the data symbol sequences $\underline{d}^{(k)}$ which are represented in equation (7) and which are disrupted by the previously mentioned additive stationary interference sequence $$\underline{n}^{(k_a)} = (\underline{n}_1^{(k_a)}, \underline{n}_2^{(k_a)} \ldots \underline{n}_{N \cdot Q+W-1}^{(k_a)})^T, n_n^{(k_a)} \in \mathbb{C}, k_a=1 \ldots K_a,$$

$$n=1 \ldots N \cdot Q+W-1, K_a, N, Q, W \notin \mathbb{IN} \quad (23)$$

with the covariance matrix $$\underline{R}_n^{(k_a)} = E\{\underline{n}^{(k_a)} \underline{n}^{(k_a)*T}\}, k_a=1 \ldots K_a, K_a \in \mathbb{IN} \quad (24).$$

After introduction of the data vector $$\underline{d} = (\underline{d}^{(1)T}, \underline{d}^{(2)T} \ldots \underline{d}^{(K)T})^T = (\underline{d}_1, \underline{d}_2 \ldots \underline{d}_{K \cdot N})^T, K, N \in \mathbb{IN}, \quad (25)$$

where $$\underline{d}_{N \cdot (k-1)+n} \stackrel{def}{=} \underline{d}_n^{(k)}, k=1 \ldots K, n=1 \ldots N, K, N \in \mathbb{IN}, \quad (26)$$

and the definition of the $(N \cdot Q+W-1) \times K \cdot N$ matrix $$\underline{A}^{(k_a)} = (\underline{A}_{ij}^{(k_a)}), \begin{array}{l} i = 1 \ldots N \cdot Q + W - 1 \\ j = 1 \ldots K \cdot N \end{array} \quad (27a)$$

$$\underline{A}_{Q \cdot (n-1)+1, N \cdot (k-1)+n}^{(k_a)} = \begin{cases} \underline{b}_l^{(k,k_a)} & \text{for} \quad k = 1, \\ & k_a = 1 \ldots K_a, \\ & l = 1 \ldots Q + W - 1 \\ & n = 1 \ldots N, \\ 0 & \text{otherwise} \end{cases} \quad (27b)$$

the received sequence can be represented by $$\underline{e}^{(k_a)} = (\underline{e}_1^{(k_a)}, \underline{e}_2^{(k_a)} \ldots \underline{e}_{N \cdot Q+W-1}^{(k_a)})^T = \underline{A}^{(k_a)} \underline{d} + \underline{n}^{(k_a)} \quad (28).$$

For the sake of easier comprehension of equation (28), the matrix A will be explained further. According to the equation (27a), the matrix A has the following form:

$$A^{(k_a)} = \begin{pmatrix} \underline{b}_1^{(1,k_a)} & 0 & \cdots & 0 & \underline{b}_1^{(2,k_a)} & 0 & \cdots & 0 \\ \underline{b}_2^{(1,k_a)} & 0 & \cdots & 0 & \underline{b}_2^{(2,k_a)} & 0 & \cdots & 0 \\ \vdots & \vdots & \vdots & \vdots & \vdots & \vdots & \vdots & \vdots \\ \underline{b}_Q^{(1,k_a)} & 0 & \cdots & 0 & \underline{b}_Q^{(2,k_a)} & 0 & \cdots & 0 \\ \underline{b}_{Q+1}^{(1,k_a)} & \underline{b}_1^{(1,k_a)} & \cdots & 0 & \underline{b}_{Q+1}^{(2,k_a)} & \underline{b}_1^{(2,k_a)} & \cdots & 0 \\ \vdots & \vdots & \vdots & \vdots & \vdots & \vdots & \vdots & \vdots \\ \underline{b}_{W+Q-1}^{(1,k_a)} & \underline{b}_{W-1}^{(1,k_a)} & \cdots & 0 & \underline{b}_{W+Q-1}^{(2,k_a)} & \underline{b}_{W-1}^{(2,k_a)} & \cdots & 0 \\ \vdots & \vdots & \vdots & 0 & \vdots & \vdots & \vdots & \vdots \\ 0 & \underline{b}_{W+Q-1}^{(1,k_a)} & \cdots & 0 & 0 & \underline{b}_{W+Q-1}^{(2,k_a)} & \cdots & 0 \\ 0 & 0 & \cdots & 0 & 0 & 0 & \cdots \\ \vdots & \vdots & \vdots & \vdots & \vdots & \vdots & \vdots & \vdots \\ 0 & 0 & \cdots & \underline{b}_{W+Q-1}^{(1,k_a)} & 0 & 0 & \cdots & \underline{b}_{W+Q-1}^{(K,k_a)} \end{pmatrix} \quad (29a)$$

$$\underline{A}^{(k_a)} = (\underline{A}^{(1,k_a)}, \underline{A}^{(2,k_a)} \ldots \underline{A}^{(K,k_a)}) \quad (29b)$$

The matrix $\underline{A}^{(k_a)}$ is composed of K sets which comprise N columns. Each set can be considered as an $(N \cdot Q+W-1) \times N$-submatrix $\underline{A}^{(k,k_a)}$. The first submatrix $\underline{A}^{(1,k_a)}$ is assigned to the subscriber 1, the following submatrix $\underline{A}^{(2,k_a)}$ is associated with the transmission of the subscriber 2, and so on. The successive transmission of the N data symbols $\underline{d}_n^{(k)}$ is taken into account within each submatrix $\underline{A}^{(k,k_a)}$. The first column of the submatrix $\underline{A}^{(k,k_a)}$ always simulates the transmission of $\underline{d}_1^{(k)}$, the second column relates to the transmission of $\underline{d}_2^{(k)}$ and so on. The number of non-negative elements per column is given by the length W of the combined channel pulse responses $\underline{b}^{(k,k_a)}$ of the equation (22). Since a new data symbol $\underline{d}_n^{(k)}$ is transmitted every Q chip, the offset of $\underline{b}_w^{(k,k_a)}$ between adjacent columns of the submatrix $\underline{A}^{(k,k_a)}$ is always Q rows for a given w. The effect of the intersymbol interference is simulated by non-zero elements in adjacent columns, but in identical rows of the submatrix $\underline{A}^{(k,k_a)}$. The arrangement of the submatrices $\underline{A}^{(k,k_a)}$ within the matrix $\underline{A}^{(k_a)}$ takes into account the simultaneous reception of K subscriber signals and, for that reason, the presence of multiple access interference.

On the basis of the discussion above, standardized mathematical representation of the case of $K_a$ receiver antennas $E_1 \ldots E_{K_a}$ will now be made. Firstly, the combined $K_a \cdot (N \cdot Q + W - 1) \times K \cdot N$ channel matrix $\underline{A}$ is defined as follows:

$$\underline{A}=(A_{i,j})=(\underline{A}^{(1)T},\underline{A}^{(2)T} \ldots \underline{A}^{(K_a)T})^T, K_a \in \mathbb{N} \quad (30).$$

The matrix $\underline{A}$ contains all the $K \cdot K_a$ combined channel pulse responses $\underline{b}^{(k,k_a)}$ of the equation (22). As already mentioned previously, the interference sequence $\underline{n}^{(k_a)}$, $k_a=1 \ldots K_a$ defined in the equation (23) is present at each of the $K_a$ receiver antennas $E_1 \ldots E_{K_a}$. The $K_a$ different interference sequences are represented by the combined interference vector $$\underline{n}=(\underline{n}^{(1)T},\underline{n}^{(2)T} \ldots \underline{n}^{(K_a)T})^T=(\underline{n}_1,\underline{n}_2 \ldots \underline{n}_{K_a \cdot (N \cdot Q+W-1)})^T, K_a, N, Q, W \in \mathbb{N} \quad (31)$$

where the following applies $$\underline{n}_{(N \cdot Q+W-1) \cdot (k_a-1)+n} \stackrel{def}{=} \underline{n}_n^{(k_a)}, k_a=1 \ldots K_a, n=1 \ldots N \cdot Q+W-1 \; K_a, N, Q, W \in \mathbb{N} \quad (32).$$

The statistical properties of $\underline{n}$ defined in equation (31) are specified by the following covariance matrix:

$$\underline{R}_n = E\{\underline{n}\,\underline{n}^{*T}\} = \begin{pmatrix} \underline{R}_n^{(1)(1)} & \underline{R}_n^{(1)(2)} & \cdots & \underline{R}_n^{(1)(K_a)} \\ \underline{R}_n^{(2)(1)} & \underline{R}_n^{(2)(2)} & \cdots & \underline{R}_n^{(2)(K_a)} \\ \vdots & \vdots & \cdots & \vdots \\ \underline{R}_n^{(K_aK1)} & \underline{R}_n^{(K_a)(2)} & \cdots & \underline{R}_n^{(K_a)(K_a)} \end{pmatrix}, \quad (33a)$$

$$\underline{R}_n^{(i)(j)}=\{\underline{n}^{(i)}\underline{n}^{(j)*T}\}, i,j=1 \ldots K_a, K_a \in \mathbb{N} \quad (33b).$$

With the combined data sequence $\underline{d}$ introduced in equation (25), with the combined channel matrix $\underline{A}$ according to equation (30) and with the combined interference sequence n specified in equation (31), the combined received signal vector is $$e=(e^{(1)T},e^{(2)T} \ldots e^{(k_a)T})^T=(e_1,e_2 \ldots e_{K_a \cdot (N \cdot Q+W-1)})^T=\underline{A}\,d+n, K_a, N, Q, W \in \mathbb{N}, \quad (34)$$

where $$e_{(N \cdot Q+W-1) \cdot (k_a-1)+n} \stackrel{def}{=} e_n^{(k_a)}, k_a=1 \ldots K_a, n=1 \ldots N \cdot Q+W-1 \; K_a, N, Q, W \in \mathbb{N} \quad (35).$$

The received signal vector $\underline{e}$ according to equation (34) is then processed in a data detector in order to determine the estimated values $\hat{\underline{d}}^{(k)}$ defined by equation (14).

A multisubscriber detection (JD=Joint Detection), in particular in conjunction with coherent receiver antenna diversity, for the case of the uplink of MC-CDMA radio systems has to date neither been implemented nor investigated. Suitable techniques for multisubscriber detection, also for application in conjunction with receiver antenna diversity, are proposed below. Since optimum JD techniques are very complex and expensive, only suboptimal methods are treated. Four suboptimal JD techniques which are based on a linear equalization and/or on a decision feedback equalization and can also be used together with coherent receiver antenna diversity are proposed, namely

- the so-called linear zero-forcing block equalizer (ZF-BLE=Zero Forcing Block Linear Equalizer), also suitable for coherent receiver antenna diversity,
- the so-called Minimum Mean Square Error Block Equalizer (MMSE-BLE=Minimum Mean Square Error Block Linear Equalizer), also suitable for coherent receiver antenna diversity,
- the so-called Zero Forcing Block Equalizer with quantized feedback (ZF-BDFE=Zero Forcing Block Decision Feedback Equalizer), also suitable for coherent receiver antenna diversity, and
- the so-called Minimum Mean Square Error Block Equalizer with quantized feedback (MMSE-BDFE=Minimum Mean Square Error Block Decision Feedback Equalizer), likewise suitable for coherent receiver antenna diversity.

All four proposed JD techniques contain a decorrelating, signal-matched filter.

Below, it is assumed that the received signal vector $\underline{e}$ defined by equation (34) is known at the receiver before the data detection is carried out. The basic concept of the JD techniques applied in an MC-CDMA system according to the invention is given by a set of equations $$\underline{S}\,\hat{\underline{d}}=\underline{M}\,\underline{e} \quad (36)$$

where $$\underline{S}=(\underline{S}_{i,j}), i,j=1 \ldots K \cdot N, \quad (37)$$

is a quadratic matrix with $K \cdot N$ rows and $K \cdot N$ columns $$\underline{M}=(\underline{M}_{i,j}), i=1 \ldots K \cdot N, j=1 \ldots N \cdot Q+W-1 \quad (38)$$

is a $K \cdot N \times K_a \cdot (N \cdot Q+W-1)$ estimation matrix and $$\hat{\underline{d}}=(\hat{\underline{d}}_1, \hat{\underline{d}}_2 \ldots \hat{\underline{d}}_{K \cdot N})^T \quad (39)$$

is the estimated value of the data vector $\underline{d}$ defined in equation (25). The selection of the matrices $\underline{M}$ and $\underline{S}$ determines the respective technique of multisubscriber detection (JD). The representations of the matrices $\underline{M}$ and $\underline{S}$ in the case of ZF-BLE, ZF-BDFE, MMSE-BLE and of MMSE-BDFE are derived below for coherent receiver antenna diversity in each case. The data symbols $\hat{\underline{d}}_n$ estimated in the estimated value $\hat{\underline{d}}$ according to equation (39) are either value-continuous (designated by $\hat{\underline{d}}_{c,n}$ and contained in $\hat{\underline{d}}_c$) or are value-discrete (designated by $\hat{\underline{d}}_{q,n}$ and contained in $\hat{\underline{d}}_q$). The value-continuous estimated values $\hat{\underline{d}}_{c,n}$ must be quantized so that the desired value-discrete estimate values ($\hat{\underline{d}}^{(1)T}, \hat{\underline{d}}^{(2)T} \ldots \hat{\underline{d}}^{(K)T})^T$ is always identical to the value-discrete estimated value $\hat{\underline{d}}_q$.

The transmission of data Symbols $\underline{d}_n^{(k)}$ with $E\{\underline{d}_n^{(k)}\}$ equal to zero is assumed below. The implementation which can be achieved by applying a particular JD technique for coherent receiver antenna diversity is dependent on the signal-to-noise ratio $\gamma(k,n)$ at the output of the JD device for coherent receiver antenna diversity. This signal-to-noise ratio $\gamma(k,n)$ is determined for each data symbol $\underline{d}_n^{(k)}$ transmitted by a subscriber k. The following applies:

$$\gamma(k, n) = \frac{\text{variance of the signal component}}{\text{variance of the noise and interference components}} \quad (40)$$

$$\gamma(k, n) = \frac{E\left\{|\hat{\underline{d}}_{N\cdot(k-1)+n}|^2\right\}_{noise-free, d_{n\,insulated}^{(k)}}}{E\left\{|\hat{\underline{d}}_{N\cdot(k-1)+n}|^2\right\}_{d_n^{(k)}=0}},$$

$$k = 1 \ldots K, n = 1 \ldots N.$$

A decorrelating, signal-matched filter (decorrelating matched filter) which is suitable to be used for coherent receiver antenna diversity is proposed below. Its method of operation requires that $\underline{A}$ according to equation (30), $\underline{R}_n$ according to equation (33a) and $\underline{e}$ according to equation (34) are known at the receiver. With the matrix Diag<$\underline{X}_{i,j}$>, which designates a diagonal matrix composed only of diagonal elements of the matrix $\underline{X}$, and with the so-called Cholesky decomposition $$\underline{R}_n^{-1} = \underline{L}^{*T}\underline{L}, \quad (41)$$

where $\underline{L}$ is an upper triangle matrix $$\underline{L} = (\underline{L}_{i,j}), \underline{L}_{i,j} = 0 \forall i > j, i,j = 1 \ldots K_a \cdot (N \cdot Q + W - 1) \quad (42),$$

the value-continuous output signal of the decorrelating, signal-matched filter for coherent receiver antenna diversity is given by:

$$\hat{\underline{d}}_c = \underline{A}^{*T} \underline{R}_n^{-1} \underline{e} \quad (43a)$$

$$= (\underline{L}\,\underline{A})^{*T} \underline{L}\, \underline{e} \quad (43b)$$

$$= \underbrace{\text{Diag}\left([(\underline{L}\,\underline{A})^{*T} \underline{L}\, \underline{A}]_{i,j}\right) \underline{d}}_{\text{useful component}} +$$

$$\underbrace{\left[(\underline{L}\,\underline{A})^{*T} \underline{L}\, \underline{A} - \text{Diag}\left([(\underline{L}\,\underline{A})^{*T} \underline{L}\, \underline{A}]_{i,j}\right)\right]}_{\text{intersymbol and multiple access interference}} \underbrace{(\underline{L}\,\underline{A})^{*T} \underline{L}\, \underline{n}}_{\text{noise}}. \quad (43c)$$

In the equations (43a) to (43c), $[\underline{X}]_{i,j}$ signifies the element in the i-th row and the j-th column of the matrix $\underline{X}$. According to the equation set (43a) to (43c), the estimated value $\hat{\underline{d}}_c$ contains both intersymbol and multiple access interference and an interference term assigned to filtered noise. From equation (43b) it follows that $\underline{S}$ is the K·N×K·N standard matrix I and the estimated matrix $\underline{M}$ is represented by $$\underline{M} = \underbrace{(\underline{L}\,\underline{A})^{*T}}_{\text{matched filter}} \underbrace{(\underline{L})}_{\text{decorrelating filter}}. \quad (44)$$

The operation $\underline{L}\,\underline{e}$ decorrelates, i.e. makes the interference white in advance. Thus, $\underline{L}$ is a white noise prefilter or decorrelation filter. The signal $\underline{L}\,\underline{e}$ is fed to the filter $(\underline{L}\,\underline{A})^{*T}$ which is-matched to the concatenation of the K·K$_a$ discrete-time channels with the combined channel pulse responses $\underline{b}^{(k,k_a)}$ of the equation (22) and is matched to the decorrelation filter $\underline{L}$. The concatenation of $\underline{L}$ with $(\underline{L}\,\underline{A})^{*T}$ is a decorrelating, signal-matched filter.

For the sake of simplicity, the hermitian matrix $$\underline{E} = \underline{A}^{*T} \underline{R}_n^{-1} \underline{A} = (\underline{L}\,\underline{A})^{*T} \underline{L}\, \underline{A} \quad (45)$$

is specified. With the proviso that the data symbols $\underline{d}_n^{(k)}$ are sampled values of a steady-state process with the covariance matrix $$\underline{R}_d = E\{\underline{d}\,\underline{d}^{*T}\} \quad (46),$$

the signal-to-noise ratio $\gamma(k,n)$ at the output of the decorrelating matched filter formulated in the equation (40) is given by $$\gamma(k, n) = \frac{E\{|d_n^{(k)}|^2\} \cdot ([E]_{v,v})^2}{[E\underline{R}_d\underline{E}]_{v,v} + (1 - 2\text{Re}\{[E\underline{R}_d]_{v,v}\}) \cdot [E]_{v,v} + E\{|d_n^{(k)}|^2\} \cdot ([E]_{v,v})^2} \quad (47)$$

$$v = N \cdot (k-1) + n, k = 1 \ldots K, n = 1 \ldots N.$$

An important special case is formed by additive white Gaussian noise of the variance $\sigma^2$ and by uncorrelated data symbols, i.e. the covariance matrix $\underline{R}_d$ is equal to the K·N×K·N standard matrix I. In this special case, the estimated matrix $\underline{M}$ is found to be $$\underline{M} = \frac{1}{\sigma^2} \underline{A}^{*T}. \quad (48)$$

According to the equation (48) the decorrelating, matched filter for coherent receiver antenna diversity is composed of $K_a$ signal-matched filters assigned to the Ka receiver antennas $E_1 \ldots E_{K_a}$.

Equation (47) is furthermore reduced to $$\gamma(k, n) = \frac{([\underline{A}^{*T}\underline{A}]_{v,v})^2}{[\underline{A}^{*T}\underline{A}\,\underline{A}^{*T}\underline{A}]_{v,v} + \sigma^2 \cdot [\underline{A}^{*T}\underline{A}]_{v,v} - ([\underline{A}^{*T}\underline{A}]_{v,v})^2}, \quad (49)$$

$$v = N \cdot (k-1) + n, k = 1 \ldots K, n = 1 \ldots N.$$

The signal-to-noise ratio $\gamma(k,n)$ specified in equation (47) is a maximum because neither intersymbol interference nor multiple access interference is present. In this case, the equation (47) is reduced to $$\gamma(k,n) = E\{|\underline{d}_n^{(k)}|^2\} \cdot [\underline{E}]_{N \cdot (k-1)+n, N \cdot (k-1)+n}, \ k=1 \ldots K, n=1 \ldots N \quad (50).$$

In the particular case mentioned above of the additive white Gaussian noise and uncorrelated data symbols, equation (50) becomes $$\gamma(k, n) = \frac{1}{\sigma^2} [\underline{A}^{*T}\underline{A}]_{N \cdot (k-1)+n, N \cdot (k-1)+n} = \sum_{k_a=1}^{K_a} \frac{\|\underline{b}^{(k,k_a)}\|^2}{\sigma^2}. \quad (51)$$

According to equation (51), the signal-to-noise ratio at the output of the decorrelating signal-matched filter for coherent receiver antenna diversity is the sum of the signal-to-noise ratios at the outputs of the $K_a$ signal-matched filters assigned to the $K_a$ receiver antennas $E_1 \ldots E_{K_a}$.

The so-called linear Zero Forcing Block Equalizer (ZF-BLE), also suitable for coherent receiver antenna diversity, is based on the Gaussian/Markovian estimation. The ZF-BLE equalization minimizes the quadratic form $$Q(\underline{d}_c) = (\underline{e} - \underline{A}\,\underline{d}_c)^{*T} \underline{R}_n^{-1} (\underline{e} - \underline{A}\,\underline{d}_c) \quad (52),$$

where $\underline{d}_c$ is a data vector with value-continuous elements $\underline{d}_{c,n}$, n=1 $\ldots$ K·N. The minimum of $Q(\underline{d}_c)$ is assigned to the estimated value $$\hat{d}_c = (\underline{A}^{*T} \underline{R}_n^{-1} \underline{A})^{-1} \underline{A}^{*T} \underline{R}_n^{-1} \underline{e} = \underline{d} + \underbrace{(\underline{A}^{*T} \underline{R}_n^{-1} \underline{A})^{-1} \underline{A}^{*T} \underline{R}_n^{-1} \underline{n}}_{\text{interference}}, \quad (53)$$

which is value-continuous and true to expectations, of the data vector $\underline{d}$ which is specified in equation (25). In accordance with equation (53), the estimated value $\hat{\underline{d}}_c$ is free of intersymbol and multiple access interference, but still contains an interference term which represents the filtered noise.

From equation (53) it follows that $\underline{S}$ is the K·N×K·N standard matrix I, and the estimated matrix $\underline{M}$ can be represented as $$\underline{M} = (\underline{A}^{*T} \underline{R}_n^{-1} \underline{A})^{-1} \underline{A}^{*T} \underline{R}_n^{-1} \quad (54).$$

The estimated matrix $\underline{M}$ can also be developed further. With the Cholesky decomposition $$\underline{A}^{*T} \underline{R}_n^{-1} \underline{A} = \underline{H}^{*T} \Sigma^2 \underline{H}, \quad (55)$$

where $\underline{H}$ is an upper triangle matrix and $\Sigma$ is a diagonal matrix, $$\underline{H} = (\underline{H}_{i,j}),\ \underline{H}_{i,j} = 0\ \forall i > j,\ \underline{H}_{i,i} = 1\ \forall i,\ i,j = 1 \ldots K \cdot N, \quad (56a)$$

$$\Sigma = \text{Diag}(\sigma_{i,j}),\ \sigma_{i,j} \in \mathrm{IR},\ i = 1 \ldots K \cdot N, \quad (56b)$$

the equation (54) can be represented as:

$$\underline{M} = \underbrace{(\Sigma\ \underline{H})^{-1}}_{\substack{\text{intersymbol and}\\ \text{multiple access canceller}}} \underbrace{(\underline{H}^{*T}\ \Sigma)^{-1}}_{\substack{\text{white noise}\\ \text{filter}}} \underbrace{(\underline{L}\ \underline{A})^{*T}}_{\substack{\text{signal-matched}\\ \text{filter}}} \underbrace{(\underline{L})}_{\substack{\text{decorrelation}\\ \text{filter}}} \quad (57)$$

As has already been mentioned before, the linear Zero Forcing Block Equalizer (ZF-BLE) contains a decorrelating signal-matched filter which is used for the received signal vector $\underline{e}$ according to equation (34). The output signal of the decorrelating signal-matched filter is fed into the white noise filter $(\underline{H}^{*T}\Sigma)^{-1}$. The combination of the filters $\underline{L}$, $(\underline{L}\ \underline{A})^{*T}$ and $(\underline{H}^{*T}\Sigma)^{-1}$ will be referred to as decorrelating, white-noise, signal-matched filter. At the output of this combined filter, a Maximum Likelihood Sequence Estimator (MLSE) can be used. The expenditure on such a Maximum Likelihood Sequence Estimator (MLSE) is, however, rather high. For this reason, it is more favorable to use a linear intersymbol and multiple access interference canceller, as specified by the expression $(\Sigma\ \underline{H})^{-1}$.

With the matrix $\underline{E}$ defined by equation (45), the signal-no-noise ratio $\gamma(k,n)$ at the output of the linear Zero Forcing Block Equalizer (ZF-BLE) can be represented by the expression $$\gamma(k, n) = \frac{E\{|d_n^{(k)}|^2\}^2}{[\underline{E}^{-1}]_{N\cdot(k-1)+n,N\cdot(k-1)+n}}, \quad (58)$$

$$k = 1 \ldots K, n = 1 \ldots N, K, N \in IN,$$

which is generally smaller than $\gamma(k,n)$ according to equation (50) at the output of the decorrelating signal-matched filter. However, the linear Zero Forcing Block Equalizer (ZF-BLE) operates better than the decorrelating signal-matched filter if the intersymbol interference and multiple access interference are considerable.

In the previously mentioned special case of the additive white Gaussian noise and uncorrelated data symbols, the estimated matrix M according to equation (54) is given by $$\underline{M} = (\underline{A}^{*T} \underline{A})^{-1} \underline{A}^{*T}, \quad (59)$$

and equation (58) is reduced to $$\gamma(k, n) = \frac{1}{\sigma^2 \cdot [(\underline{A}^{*T}\underline{A})^{-1}]_{N\cdot(k-1)+n,N\cdot(k-1)+n}}, \quad (60)$$

$$k = 1 \ldots K, n = 1 \ldots N, K, N \in IN.$$

The so-called Zero Forcing Block Equalizer with quantized feedback (ZF-BDFE), also suitable for coherent receiver antenna diversity, will be derived below on the basis of the linear Zero Forcing Block Equalizer (ZF-BLE) just described, suitable for coherent receiver antenna diversity. The derivation of the ZF-BDFE equalizer makes use of the structure of the upper triangle matrix H. With equations (53) and (57) the following applies $$H\hat{\underline{d}}_c = \hat{\underline{d}}_c + (H - I)\hat{\underline{d}}_c = \Sigma^{-1}(\underline{H}^{*T}\Sigma)^{-1}(\underline{L}\underline{A})^{*T}\underline{L}\underline{e} \quad (61a)$$

$$= \underline{M}\underline{e}, \quad (61b)$$

where the estimated matrix $$\underline{M} = \Sigma^{-1}(\underline{H}^{*T}\Sigma)^{-1}(\underline{L}\ \underline{A})^{*T}\underline{L} \quad (62)$$

is used and I designates the K·N×K·N standard matrix. According to equation (62), the so-called Zero Forcing Block Equalizer with quantized feedback (ZF-BDFE), which is also intended to be suitable for coherent receiver antenna diversity, contains a decorrelating, white noise, signal-matched filter. The equivalencies $$\hat{d}_{c,K\cdot N} = \sum_{j=1}^{K_a \cdot (N \cdot Q + W - 1)} M_{K\cdot N, j} e_j, \quad (63a)$$

$$\hat{d}_{c,n} + \sum_{j=n+1}^{K\cdot N} H_{n,j} \hat{d}_{c,j} = \sum_{j=1}^{K_a \cdot (N \cdot Q + W - 1)} M_{n,j} e_j, \quad (63b)$$

$$n = 1 \ldots K \cdot N - 1,$$

follow from the equation (61b). According to the equation (63a), the estimated value $\hat{\underline{d}}_{c,K\cdot N}$ is determined by the linear superimposition of the $K_a\cdot(N\cdot Q+W-1)$ weighted elements $\underline{M}_{K\cdot N, j} \underline{e}_j$. All the other estimated values $\hat{\underline{d}}_{c,n}$ are, furthermore, influenced by the $\underline{H}_{n,n+2}\hat{d}_{c,n+2} \ldots \underline{H}_{n,K\cdot N} \hat{\underline{d}}_{c,K\cdot N}$, cf. equation (63b). With the proviso that the equation set given in (63a) and (63b) is solved recursively with n decreasing from K·N as far as one, a so-called Zero Forcing Block Equalization with quantized feedback (ZF-BDFE), which is also suitable for coherent receiver antenna diversity, can be implemented. If $\hat{\underline{d}}_{c,j}$, j=(n+1) . . . (K·N) in equation (63b) is replaced by the quantized versions $\hat{\underline{d}}_{q,j}$, the Zero Forcing Block Equalizer with quantized feedback (ZF-BDFE), also suitable for coherent receiver antenna diversity, is found to be $$\hat{d}_{c,K\cdot N} = \sum_{j=1}^{K_a \cdot (N \cdot Q + W - 1)} M_{K\cdot N, j} e_j, \quad (64a)$$

-continued $$\hat{d}_{c,n} + \sum_{j=n+1}^{K \cdot N} H_{n,j} \hat{d}_{q,j} = \sum_{j=1}^{K_a \cdot (N \cdot Q + W - 1)} M_{n,j} e_j, \quad (64b)$$

$$n = 1 \ldots K \cdot N - 1.$$

With $$[\underline{x}]_j^i \stackrel{def}{=} (\underline{x}_i, \underline{x}_{i+1} \ldots \underline{x}_j)^T \quad i \le j \quad (65a)$$

$$[\underline{X}]_{q,j}^{p,i} \stackrel{def}{=} \begin{pmatrix} \underline{X}_{p,i} & \underline{X}_{p,i+1} & \cdots & \underline{X}_{p,j} \\ \underline{X}_{p+1,i} & \underline{X}_{p+1,i+1} & \cdots & \underline{X}_{p+1,j} \\ \vdots & \vdots & \cdots & \vdots \\ \underline{X}_{q,i} & \underline{X}_{q,i+1} & \cdots & \underline{X}_{q,j} \end{pmatrix}^T, \quad (65b)$$

$$p \le q, i \le j,$$

the following is obtained from equation (61b)

$$([I]_{K \cdot N, n}^{1,1}, [\underline{H} - I]_{K \cdot N, K \cdot N}^{1, n+1}) \left( \left( [\hat{\underline{d}}_c]_n^1 \right)^T, \left( [\hat{\underline{d}}_q]_{K \cdot N}^{n+1} \right)^T \right)^T = \underline{M} \, \underline{e}. \quad (66a)$$

$$[\underline{H} - I]_{K \cdot N, K \cdot N}^{1, n+1}$$

is the feedback operator. The following $$\underline{S} = ([I]_{K \cdot N, n}^{1,1}, [\underline{H} - I]_{K \cdot N, K \cdot N}^{1, n+1}), \quad (67a)$$

$$\hat{\underline{d}} = \left( \left( [\hat{\underline{d}}_c]_n^1 \right)^T, \left( [\hat{\underline{d}}_q]_{K \cdot N}^{n+1} \right)^T \right)^T, \quad (67b)$$

reveal the structure of equation (36). Both variables $\underline{S}$ and $\hat{\underline{d}}$ given by the equation set (67a) and (67b) must experience an update at each moment in time $nT_s$.

The signal-to-noise ratio $\gamma(k,n)$ at the output of the ZF-BDFE equalizer is given by $$\gamma(k,n) = E\{|\underline{d}_n^{(k)}|^2\} \cdot (\sigma_{N \cdot (k-1)+n, N \cdot (k-1)+n})^2, \; k=1 \ldots N, \, K, \, N \in \mathbb{IN} \quad (68)$$

with the proviso that all preceding decisions which are fed back are correct. The signal-to-noise ratio $\gamma(k,n)$ according to equation (68) is generally larger than the signal-to-noise ratio $\gamma(k,n)$ given by equation (58), at the output of the ZF-BLE equalizer. However, in the case of incorrect preceding decisions, the operation of ZF-BDFE equalizer does suffer propagations of errors. As has already been mentioned, the operation of the ZF-BDFE equalizer can be improved by the application of channel sorting.

Like the linear Zero Forcing Block Equalizer (ZF-BLE), which is also suitable for coherent receiver antenna diversity, and the Zero Forcing Block Equalizer with quantized feedback (ZF-BDFE), which is likewise configured for coherent receiver antenna diversity, the so-called Minimum Mean Square Error Block Equalizer (MMSE-BLE), which is also suitable for coherent receiver antenna diversity, makes use of the knowledge of the matrix $\underline{A}$, specified in equation (27a), of the interference signal vector $\underline{n}$ according to equation (23) and of the received signal vector $\underline{e}$ introduced according to equation (34). The quadratic form $$Q(\underline{d}_c) = E\{(\underline{d}_c - \underline{d})^{*T}(\underline{d}_c - \underline{d})\} \quad (69a)$$

$$= E\{\|\underline{d}_c - \underline{d}\|^2\} \quad (69b)$$

must be minimized by means of the MMSE-BLE equalizer. The data vector $\underline{d}_c$ is composed of the value-continuous elements $\underline{d}_{c,n}$, n=1 . . . K·N. The quadratic form $Q(d_c)$ assumes its minimum value when $\underline{d}_c$ is equal to the value-continuous and uninfluenced estimated value $$\hat{\underline{d}}_c = (\underline{A}^{*T} \underline{R}_n^{-1} \underline{A} + \underline{R}_d^{-1})^{-1} \underline{A}^{*T} \underline{R}_n^{-1} \underline{e} \quad (70a)$$

$$= \underbrace{(I + (\underline{R}_d \underline{A}^{*T} \underline{R}_n^{-1} \underline{A})^{-1})^{-1}}_{\text{Wien filter } \underline{W}_0} \underbrace{(\underline{A}^{*T} \underline{R}_n^{-1} \underline{A})^{-1} \underline{A}^{*T} \underline{R}_n^{-1} \underline{e}}_{\text{ZF-BLE}}$$

$$= \underbrace{\text{Diag}(\{\underline{W}_0\}_{i,j}) \underline{d}}_{\text{useful component}} + \underbrace{[\underline{W}_0 - \text{Diag}(\{\underline{W}_0\}_{i,j})] \underline{d}}_{\text{intersymbol and multiple access interference}} + \quad (70b)$$

$$\underbrace{\underline{W}_0 (\underline{A}^{*T} \underline{R}_n^{-1} \underline{A})^{-1} \underline{A}^{*T} \underline{R}_n^{-1} \underline{n}}_{\text{noise}} \quad (70c)$$

where I designates the K·N×K·N standard matrix. According to the equation set (70a) to (70c), the estimated value $\hat{\underline{d}}_c$ contains a useful term, a term relating to the intersymbol and multiple access interference and an interference term and it represents the output signal of the ZF-BLE equalizer which has already been dealt with and downstream of which a Wien filter $$\underline{W}_0 = (I + (\underline{R}_d \underline{A}^{*T} \underline{R}_n^{-1} \underline{A})^{-1})^{-1} \quad (71)$$

is connected. Owing to the equation set (70a) to (70c), S is identical to the K·N×K·N standard matrix Z, and the estimated matrix $\underline{M}$ can be represented in the form of $$\underline{M} = \underline{W}_0 (\Sigma \, \underline{H})^{-1} (\underline{H}^{*T} \Sigma)^{-1} (\underline{L} \, \underline{A})^{*T} \underline{L} \quad (72).$$

According to equation (72), the MMSE-BLE equalizer contains a decorrelating, signal-matched filter which is used for the received signal vector $\underline{e}$ according to equation (34). The output signal of the decorrelating, signal-matched filter is fed into the linear intersymbol and multiple access canceller $(\Sigma \underline{H})^{-1}$ downstream of which the Wien filter $\underline{W}_0$ is connected. Since the Wien filter minimizes the anticipated value of the squared norm of the estimated error vector $(\underline{d}_c - \underline{d})$, the MMSE-BLE equalization gives rise to better power than the ZF-BLE equalization, which also applies in the case of coherent receiver antenna diversity. In addition, it is possible to show readily that the estimated errors $(\underline{d}_{c,n} - \underline{d}_n)$ and the estimated data symbols $\hat{\underline{d}}_{c,n}$ at the output of the MMSE equalizer are uncorrelated.

The signal-to-noise ratio $\gamma(k,n)$ at the output of the MMSE-BLE equalizer is given by the expression $$\gamma(k, n) = \frac{E\{|d_n^{(k)}|^2\} \cdot |[\underline{W}_0]_{v,v}|^2}{[\underline{W}_0 \, R_d]_{v,v} - 2\text{Re}\{[\underline{W}_0 \, R_d]_{v,v} \cdot} \quad (73)$$

$$[\underline{W}_0]_{v,v}^*\} + E\{|d_n^{(k)}|^2\} \cdot |[\underline{W}_0]_{v,v}|^2$$

$$v = N \cdot (k-1) + n, \, k = 1 \ldots K, \, n = 1 \ldots N, \, K, \, N \in IN,$$

which is generally larger than the signal-to-noise ratio $\gamma(k,n)$, presented in equation (58), at the output of the ZF-BLE equalizer which has already been described previously.

In the previously mentioned particular case of the additive white Gaussian noise and uncorrelated data symbols, the estimated matrix $\underline{M}$ is found to be $$\underline{M} = (I + \sigma^2 \cdot (\underline{A}^{*T}\underline{A})^{-1})^{-1} \cdot (\underline{A}^{*T}\underline{A})^{-1}\underline{A}^{*T}, \quad (74)$$

and equation (73) is reduced to $$\gamma(k,n) = \frac{[\underline{W}_0]_{v,v}}{1 - [\underline{W}_0]_{v,v}}, \quad (75)$$

$$v = N \cdot (k-1) + n, k = 1 \ldots K, n = 1 \ldots N, K, N \in IN,$$

where $\underline{W}_0 = (I + \sigma^2 \cdot (\underline{A}^{*T}\underline{A})^{-1})^{-1}$.

On the basis of the so-called Minimum Mean Square Error Block Equalizer (MMSE-BLE) which is treated above and which is configured for coherent receiver antenna diversity, the so-called Minimum Mean Square Error Block Equalizer with quantized feedback (MMSE-BDFE), which is also suitable for coherent receiver antenna diversity, will be derived in a similar way, as has already been done for the ZF-BDFE equalizer. With the Cholesky decomposition $$\underline{A}^{*T}\underline{R}_n^{-1}\underline{A} + \underline{R}_d^{-1} = (\Sigma \underline{H}')^{*T}\Sigma \underline{H}', \quad (76)$$

in which the matrices $$\underline{H}' = (\underline{H}'_{i,j}), \underline{H}'_{i,j} = 0 \forall i > j, \underline{H}'_{i,i} = 1 \forall i, i,j = 1 \ldots K \cdot N \quad (77a)$$

$$\Sigma = \text{Diag} (\sigma_{i,i}), \sigma_{i,i} \in IR, i = 1 \ldots K \cdot N \quad (77)$$

are used, and with the estimated matrix $$\underline{M} = \Sigma^{-1}(\underline{H}'^{*T}\Sigma)^{-1}(\underline{L}\,\underline{A})^{*T}\underline{L} \quad (78)$$

the MMSE-BDFE equalizer can be represented as follows:

$$([I]_{K \cdot N,n}^{1,1}, [H' - I]_{K \cdot N, K \cdot N}^{1,n+1})\left(\left([\hat{d}_c]_n^1\right)^T, \left([\hat{d}_q]_{K \cdot N}^{n+1}\right)^T\right)^T = Me. \quad (79)$$

The matrix $[H' - I]_{K \cdot N, K \cdot N}^{1,n+1}$ represents the feedback operator. The following $$S = ([I]_{K \cdot N,n}^{1,1}[H' - I]_{K \cdot N, K \cdot N}^{1,n+1}) \quad (80a)$$

$$\hat{d} = (([\hat{d}_c]_n^1)^T, ([\hat{d}_q]_{K \cdot N}^{n+1})^T)^T \quad (80b)$$

reveal the structure of the equation (36).

The signal-to-noise ratio $\gamma(k,n)$ at the output of the MMSE-BDFE equalizer is given by $$\gamma(k,n) = \frac{E\{|d_n^{(k)}|^2\} \cdot |(\sigma'_{v,v})^2 [(H'R_d)^{-1}]_{v,v}|^2}{E\{|d_n^{(k)}|^2\} \cdot |[(H'R_d)^{-1}]_{v,v}|^2 - 2\text{Re}\{[(H'R_d)^{-1}]_{v,v}\} + (\sigma'_{v,v})^2} \quad (81)$$

$$v = N \cdot (k-1) + n, K = 1 \ldots K, n = 1 \ldots N, K, N \in IN,$$

with the proviso that all the preceding decisions which have been fed back are correct. The signal-to-noise ratio $\gamma(k,n)$ according to equation (81) of the MMSE-BDFE equalizer is generally larger than the signal-to-noise ratio $\gamma(k,n)$, given by equation (68), of the ZF-BDFE equalizer.

In summary, it is to be noted that the CDMA system structure which is produced by means of the invention is equivalent to that of a CDMA system with DS (Direct Sequence=direct spreading sequence). The introduction of the multicarrier (MC) method is achieved by means of a suitable selection of the spreading code. By means of this procedure according to the invention, on the one hand the production of signals in CDMA systems with DS and with multicarrier (MC) methods is harmonized and, on the other hand, the expansion and application of already known methods for multisubscriber detection (JD=Joint Detection) both with and without diversity reception is made possible in CDMA systems with multicarrier methods.

The fields of application for a system designed according to the invention are, apart from generally in mobile radio, inter alia, for example, microwave radio, satellite radio, marine radio, WLL (Wireless Local Loop), WLAN (Wireless Local Area Network), MBS (Mobile Broadband Systems), FPLMTS (Future Public Land Mobile Telecommunication—Systems, IMT-2000), UMTS (Universal Mobile Telecommunication Systems), PCS (Personal Communication Services), PCN (Personal Communication Networks), cordless telephone equipment (CT), HDTV (High Definition Television), cable television (CATV), RITL (Radio in the Loop), Indoor radio, PABX (Public Access Branch Exchange), submarine radio and deep space communications.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A system for transmitting digital signals by radio between a plurality of subscriber stations and a base station using the so-called MC-CDMA (Multicarrier—Code Division Multiple Access) method in which a plurality of useful links are processed simultaneously in a common RF frequency band, comprising:

data blocks of finite length, which can be represented by data vectors $$\underline{d}^{(k)} = (\underline{d}_1^{(k)}, \underline{d}_2^{(k)} \ldots \underline{d}_N^{(k)})^T, \underline{d}_n^{(k)} \in C, k = 1 \ldots K, n = 1 \ldots N, K, N \in IN,$$

each of the data vectors being composed of N complex data symbols $\underline{d}_n^{(k)}$ to the base m with a data symbol period length $T_s$; K subscriber stations for transmitting the data blocks with application of a spread code, assigned to a respective subscriber station k, k=1 ... K, with Q subcarriers distributed uniformly within an RF radio frequency band;

a reception site using said spread code and a CDMA detector device for decoding the data blocks;

a number of data symbols $\underline{d}_n^{(k)}$ transmitted simultaneously by a specific subscriber station k being one and all the data symbols $\underline{d}_n^{(k)}$ of a subscriber station being transmitted successively; said transmission using the Q subcarriers of bandwidth $B_s = B_U/Q = 1/T_s$, the subcarriers numbered with g=1 ... Q each having a single center of frequency $f_q$, q=1 ... Q, in accordance with $$f_q = \frac{q-1}{T_s}, \quad q = 1 \ldots Q$$

each data symbol $\underline{d}_n^{(k)}$ of a subscriber station being spread over all the Q subcarriers of the bandwidth $B_s$ by a subscriber-specific signature code sequence $\underline{c}^{(k)}=(\underline{c}_1^{(k)}, \underline{c}_2^{(k)} \ldots \underline{c}_Q^{(k)})^T, \underline{c}_q^{(k)} \in C, k=1 \ldots K, q=1 \ldots Q, K, Q \in IN$ composed of chips $\underline{c}_q^{(k)}$, each chip being assigned to a particular subcarrier; a linearly modulated signal, which is transmitted by a subscriber station, k, k=1 ... K which is given in the equivalent low-pass filter region by $$\underline{d}^{(k)}(t) = \sum_{n=1}^{N} d_n^{(k)} \cdot \underline{c}^{(k)}(t-[n-1]T_s; \underline{c}^{(k)}),$$

linear MC-CDMA spread modulation being formed by samplings of a $\underline{c}^{(k)}$ ($t;\underline{c}^{(k)}$) made at a rate $1/T_c$, the sampled values $\underline{\zeta}_q^{(k)}$, q=1 ... Q, K produced by these samplings giving rise to vectors $\underline{\zeta}^{(k)}=(\underline{\zeta}_1^{(k)}, \underline{\zeta}_2^{(k)} \ldots \underline{\zeta}_Q^{(k)})^T, \underline{\zeta}_q^{(k)} \in C, k=1 \ldots K, q=1 \ldots Q, K, Q \in IN;$ a relation between the vectors $\underline{\zeta}^{(k)}$ and the spread code vectors $\underline{c}^{(k)}$ being given the equation $\underline{\zeta}^{(k)}=\underline{D}\ \underline{c}^{(k)}$ with a matrix $$\underline{D} = (D_{\alpha,\beta}), D_{\alpha,\beta} = \frac{1}{\sqrt{Q}} \exp\left\{j\frac{2\pi}{Q}(\alpha-1)(\beta-1)\right\},$$

$\alpha, \beta = 1 \ldots Q$ of an inverse discrete Fourier transformation (IDFT), a vector matrix $\underline{\zeta}^{(k)}$ containing Q column vectors $$\underline{\delta}^{(q)} = (\delta_1^{(q)}, \delta_2^{(q)} \ldots \delta_Q^{(q)})^T, \delta_\alpha^{q} = \frac{1}{\sqrt{Q}} \exp\left\{j\frac{2\pi}{Q}(\alpha-1)(q-1)\right\},$$

$\alpha=1 \ldots Q$, so that $\underline{D}=(\underline{\delta}^{(1)}, \underline{\delta}^{(2)} \ldots \underline{\delta}^{(Q)})$ and thus $\underline{\zeta}^{(k)}=(\underline{c}_1^{(k)}\underline{\delta}^{(1)}+\underline{c}_2^{(k)}\underline{\delta}^{(2)}+\ldots+\underline{c}_Q^{(k)}\underline{\delta}^{(Q)})$ is obtained;
since each chip $\underline{c}_q^{(k)}$ is assigned to a particular subcarrier q, the equation $\underline{\zeta}^{(k)}=\underline{D}\ \underline{c}^{(k)}$ is interpreted such that columns $\underline{\delta}^{(q)}$, q=1 ... Q of the matrix $\underline{D}$ represent the Q subcarriers and rows of the matrix $\underline{D}$ represent Q time moments within the data symbol period length $T_s$ during which sampled values are taken; and a result of the equation $\underline{\zeta}^{(k)}=\underline{D}\ \underline{c}^{(k)}$ being a vector $\underline{\zeta}^{(k)}$ with elements $\underline{\zeta}_g^{(k)}$ which result from a linear combination of the chips $\underline{c}_q^{(k)}$.

2. The system as claimed in claim 1, wherein the system is a CDMA system with multicarrier method and coherent receiver antenna diversity.

3. The system as claimed in claim 1 in a CDMA detector device at the receive end of a station, having $K_a$ receiver antennas, for determining the estimated values $\underline{\hat{d}}^{(k)}=(\hat{d}_1^{(k)}, \hat{d}_2^{(k)} \ldots \hat{d}_N^{(k)})^T, \hat{d}_n^{(k)} \in C, k=1 \ldots K, n=1 \ldots N, K, N \in IN,$ of the data symbol sequences $\underline{d}^{(k)}$ a received signal vector e, which results from $\underline{e}=(\underline{e}^{(1)T}, \underline{e}^{(2)T} \ldots \underline{e}^{(k_a)T})^T=(\underline{e}_1,\underline{e}_2\ldots_{-K_a \cdot (N \cdot Q+W-1)})^T=\underline{A}\ \underline{d}+\underline{n}, K_a, N, Q, W \in IN,$ where the combined $K_a \cdot (N \cdot Q+W-1) \times K \cdot N$ channel matrix A contains all $K \cdot K_a$ combined channel pulse responses $\underline{b}^{(k,k_a)}=(\underline{b}_1^{(k,k_a)},\underline{b}_2^{(k,k_a)} \ldots \underline{b}_{Q+W-1}^{(k,k_a)})^T=\underline{h}^{(k,k_a)}*\underline{c}^{(k)},$ $\underline{h}^{(k,k_a)} \in C, k=1 \ldots K, k_a=1 \ldots k_a, l=1 \ldots Q+W-1, K, K_a, Q, W \in IN,$ W=number of complex sampled values $\underline{h}_w^{(k,k_a)}$, and where $K_a$ various interference sequences are represented by combined interference vector $\underline{n}=(\underline{n}^{(1)T},\underline{n}^{(2)T} \ldots \underline{n}^{(k_a)T})^T=(\underline{n}_1,\underline{n}_2 \ldots \underline{n}_{K_a \cdot (N \cdot Q+W-1)})^T, K_a, N, Q, W \in IN$ and the data sequence d is represented by the data symbol vector $\underline{d}=(\underline{d}^{(1)T},\underline{d}^{(2)T} \ldots \underline{d}^{(K)T})^T=(\underline{d}_1,\underline{d}_2 \ldots \underline{d}_{K \cdot N})^T, K, N \in IN.$ 4. The system as claimed in claim 3, wherein the CDMA detector device is a CDMA detector device for multisubscriber detection (JC, Joint Detection) at the receive end, wherein said detector device operates sub-optimally and is based on one of a linear equalization and a decision feedback equalization, wherein the detector device contains a decorrelating, signal-matched filter, wherein, on a proviso that the received signal vector e defined by $\underline{e}=(\underline{e}^{(1)T},\underline{e}^{(2)T} \ldots \underline{e}^{(k_a)T})^T=(\underline{e}_1,\underline{e}_2 \ldots_{-k_a \cdot (N \cdot Q+W-1)})^T=\underline{A}\ \underline{d}+\underline{n}, K_a, N, Q, W \in IN,$ is known at the receiver, an operating principle of a JD detector device is specified by a set of equations $\underline{S}\underline{\hat{d}} = \underline{M}\underline{e}$, where $\underline{S}=(\underline{S}_{i,j})$, i,j=1 ... K·N, a quadratic matrix with K·N rows and K·N columns, $\underline{M}=(\underline{M}_{i,j}), i=1 \ldots K \cdot N, j=1 \ldots N \cdot Q+W-1, a K \cdot N \times K_a \cdot (N \cdot Q+W-1)$ estimated matrix and $\underline{\hat{d}}=(\hat{d}_1, \hat{d}_2 \ldots \hat{d}_{K \cdot N})_T$ is an estimated value of the data vector $\underline{d}$ defined in the equation for the received signal vector $\underline{e}$.

5. The system as claimed in claim 4, wherein the system further comprises a linear data block equalizer with a following quantization stage as the CDMA detector device, when value-continuous estimated values of the data symbols are determined in the block equalizer and are combined to form vectors, and wherein value-discrete estimated values of the data symbols are acquired in the quantization stage by quantizing the value-continuous estimated values.

6. The system as claimed in claim 5, wherein the linear block equalizer is a linear zero forcing block equalizer.

7. The system as claimed in claim 5, wherein the linear block equalizer is a minimum mean square error block equalizer.

8. The system as claimed in claim 4, wherein the linear block equalizer a data block equalizer with quantized feedback.

9. The system as claimed in claim 8, wherein the linear block equalizer a zero forcing block equalizer with quantized feedback.

10. The system as claimed in claim 8, wherein the linear block equalizer minimum mean square error block equalizer with quantized feedback.

11. The system as claimed in claim 1, wherein the system further comprises a digital signal processor which contains the CDMA detector device at the receive end.

12. The system as claimed in claim 11, wherein the signal processor also contains channel estimators.

13. The system as claimed in claim 11, wherein the signal processor is a microprocessor.

14. The system as claimed in claim 1, wherein the system is utilized in the framework of a hybrid multiple access method which consists of a combination of Code Division Multiple Access with multicarrier method, Frequency Division Multiple Access and Time Division Multiple Access.

15. The system as claimed in claim 1, wherein the system further comprises antenna diversity at the receive end.

16. The system as claimed in claim 1, wherein the system further comprises an adaptive diversity with directional antennas.

17. The system as claimed in claim 1, wherein the system further comprises a non-adaptive diversity with directional antennas.

18. The system as claimed in claim 1, wherein the system further comprises an expansion of the data modulation from linear to non-linear data modulation.

19. The system as claimed in claim 1, wherein the system further comprises an expansion of linear spread modulation to non-linear spread modulation.

20. The system as claimed in claim 1, wherein the system further comprises a code spread with orthogonal sequences, in one of an uplink, a downlink in both directions.

21. The system as claimed in claim 1, wherein the system further comprises a code spread with non-orthogonal sequences, in uplink a downlink and in both directions.

22. The system as claimed in claim 1, wherein the system further comprises binary spread sequences.

23. The system as claimed in claim 1, wherein the system further comprises non-binary spread sequences.

24. The system as claimed in claim 1, wherein the system is utilized for mobile radio.

25. The system as claimed in claim 1, wherein the system is utilized for microwave radio.

26. The system as claimed in claim 1, wherein the system is utilized for satellite radio.

27. The system as claimed in claim 1, wherein the system is utilized for marine radio.

28. The system as claimed in claim 1, wherein the system is utilized for cordless telephone.

29. The system as claimed in claim 1, wherein the system is utilized for cable television.

30. The system as claimed in claim 1, wherein the system is utilized for submarine radio.

31. The system as claimed in claim 1, wherein the system further comprises quaternary spread sequences.

* * * * *